United States Patent
Karpovsky et al.

(10) Patent No.: US 12,388,852 B2
(45) Date of Patent: Aug. 12, 2025

(54) DETECTING MASS CONTROL PLANE OPERATIONS

(71) Applicant: Microsoft Technology Licensing, LLC, Redmond, WA (US)

(72) Inventors: Andrey Karpovsky, Kiryat Motzkin (IL); Ram Haim Pliskin, Rishon Lezion (IL); Evgeny Bogokovsky, Kfar-Saba (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 219 days.

(21) Appl. No.: 17/679,550

(22) Filed: Feb. 24, 2022

(65) Prior Publication Data

US 2023/0269262 A1    Aug. 24, 2023

(51) Int. Cl.
*H04L 9/40*        (2022.01)
*G06F 21/55*       (2013.01)

(52) U.S. Cl.
CPC ...... *H04L 63/1425* (2013.01); *H04L 63/1441* (2013.01)

(58) Field of Classification Search
CPC ............. H04L 63/1425; H04L 63/1441; H04L 2209/60; H04L 63/10; G06F 21/10; G06F 21/62
See application file for complete search history.

(56) References Cited

U.S. PATENT DOCUMENTS

| | | | |
|---|---|---|---|
| 8,379,857 B1* | 2/2013 | Zheng | H04L 63/062 380/255 |
| 9,479,518 B1 | 10/2016 | Fang et al. | |
| 10,461,991 B1 | 10/2019 | Morley et al. | |

(Continued)

FOREIGN PATENT DOCUMENTS

TW         201635742 A      10/2016

OTHER PUBLICATIONS

Wang et al., "Detecting Anomalous Behaviours Based on System Logs: A Dynamic Graph Perspective," 2023 8th International Conference on Intelligent Computing and Signal Processing (ICSP) Year: 2023 | Conference Paper | Publisher: IEEE.*

(Continued)

*Primary Examiner* — Roderick Tolentino
(74) *Attorney, Agent, or Firm* — Weaver IP L.L.C.

(57) ABSTRACT

Methods, systems, apparatuses, and computer-readable storage mediums described herein are configured to detect mass control plane operations, which may be indicative of anomalous (or malicious) behavior. For example, one or more logs that specify a plurality of access enablement operations performed with respect to an entity is received. The log(s) are analyzed to identify a number of access enablement operations that occurred in a particular time period. A determination is made as to whether the identified number of access enablement operations meets a threshold condition (e.g., to determine whether an unusually high number of such operations occurred in a given time period). Based on (Continued)

the threshold condition being met, a determination is made that anomalous behavior has occurred with respect to the entity. Responsive to determining that the potentially behavior has occurred, a mitigation action may be performed that mitigates the behavior.

20 Claims, 6 Drawing Sheets

(56) References Cited

U.S. PATENT DOCUMENTS

| | | | | |
|---|---|---|---|---|
| 11,558,193 | B2* | 1/2023 | Acharya | H04L 9/3213 |
| 2007/0028099 | A1* | 2/2007 | Entin | H04L 63/062 |
| | | | | 713/163 |
| 2010/0192201 | A1 | 7/2010 | Shimoni et al. | |
| 2013/0145033 | A1* | 6/2013 | Polla | G06Q 10/06 |
| | | | | 709/226 |
| 2013/0212484 | A1 | 8/2013 | Joshi | |
| 2013/0275590 | A1* | 10/2013 | Wong | H04L 67/01 |
| | | | | 709/225 |
| 2015/0180894 | A1 | 6/2015 | Sadovsky et al. | |
| 2015/0229510 | A1* | 8/2015 | Rao | H04L 63/145 |
| | | | | 726/24 |
| 2017/0009387 | A1 | 1/2017 | Ge et al. | |
| 2017/0093878 | A1 | 3/2017 | Rodniansky | |
| 2017/0099311 | A1 | 4/2017 | Kesin et al. | |
| 2017/0126627 | A1* | 5/2017 | Yang | H04L 63/20 |
| 2017/0126709 | A1 | 5/2017 | Baradaran et al. | |
| 2017/0366576 | A1* | 12/2017 | Donahue | H04L 63/1416 |
| 2019/0253443 | A1 | 8/2019 | Vasudevan et al. | |
| 2019/0306196 | A1 | 10/2019 | Lango et al. | |
| 2020/0111099 | A1* | 4/2020 | Benkreira | G06Q 20/4014 |
| 2020/0267057 | A1 | 8/2020 | Garvey et al. | |
| 2020/0285737 | A1 | 9/2020 | Kraus et al. | |
| 2020/0327252 | A1 | 10/2020 | McFall et al. | |
| 2020/0380117 | A1 | 12/2020 | Marwah et al. | |
| 2021/0194913 | A1 | 6/2021 | Hecht et al. | |
| 2021/0377210 | A1* | 12/2021 | Singh | H04L 67/125 |
| 2021/0406112 | A1 | 12/2021 | Moss | |
| 2022/0066998 | A1 | 3/2022 | Jha | |
| 2022/0121507 | A1 | 4/2022 | Jha | |
| 2022/0247776 | A1 | 8/2022 | Hecht | |
| 2023/0134546 | A1 | 5/2023 | Gopalakrishnan | |
| 2023/0215198 | A1 | 7/2023 | Cheluvaraju | |
| 2023/0231854 | A1 | 7/2023 | Blake | |
| 2023/0267198 | A1 | 8/2023 | Karpovsky et al. | |

OTHER PUBLICATIONS

Benova et al., "Detecting anomalous user behavior from NGINX web server logs," 2022 IEEE Zooming Innovation in Consumer Technologies Conference (ZINC) Year: 2022 | Conference Paper | Publisher: IEEE.*

"International Search Report and Written Opinion Issued in PCT Application No. PCT/US23/011090", Mailed Date: Apr. 5, 2023, 10 Pages.

"International Search Report and Written Opinion Issued in PCT Application No. PCT/US23/011091", Mailed Date: Apr. 14, 2023, 10 Pages.

Non-Final Office Action mailed on Apr. 12, 2024, in U.S. Appl. No. 17/679,553, 16 pages.

Final Office Action mailed on Oct. 8, 2024, in U.S. Appl. No. 17/679,553, 17 pages.

Landauer, et al., "A Framework for Cyber Threat Intelligence Extraction from Raw Log Data", IEEE International Conference on Big Data (Big Data), Dec. 12, 2019, 10 Pages.

Non-Final Office Action mailed on Feb. 28, 2025, in U.S. Appl. No. 17/679,553, 18 pages.

* cited by examiner

DETECTING MASS CONTROL PLANE OPERATIONS

BACKGROUND

Cloud computing platforms offer higher efficiency, greater flexibility, lower costs, and better performance for applications and services relative to "on-premises" servers and storage. Accordingly, users are shifting away from locally maintaining applications, services, and data and migrating to cloud computing platforms. This migration has gained the interest of malicious entities, such as hackers. Hackers attempt to gain access to valid cloud subscriptions and user accounts in an attempt to steal and/or hold ransom sensitive data or leverage the massive amount of computing resources for their own malicious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to detect mass control plane operations (e.g., resource management operations, resource configuration operations, resource access enablement operations, etc.), which may be indicative of anomalous (or malicious) behavior. For example, one or more logs are received that specify a plurality of access enablement operations performed with respect to an entity. The log(s) are analyzed to identify a number of access enablement operations that occurred in a particular time period. A determination is made as to whether the identified number of access enablement operations meet a threshold condition (e.g., to determine whether an unusually high number of access enablement operations occurred in a given time period). Based on the threshold condition being met, a determination is made that potentially anomalous behavior has occurred with respect to the entity. Responsive to determining that potentially anomalous behavior has occurred, a mitigation action may be performed that mitigates the behavior.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
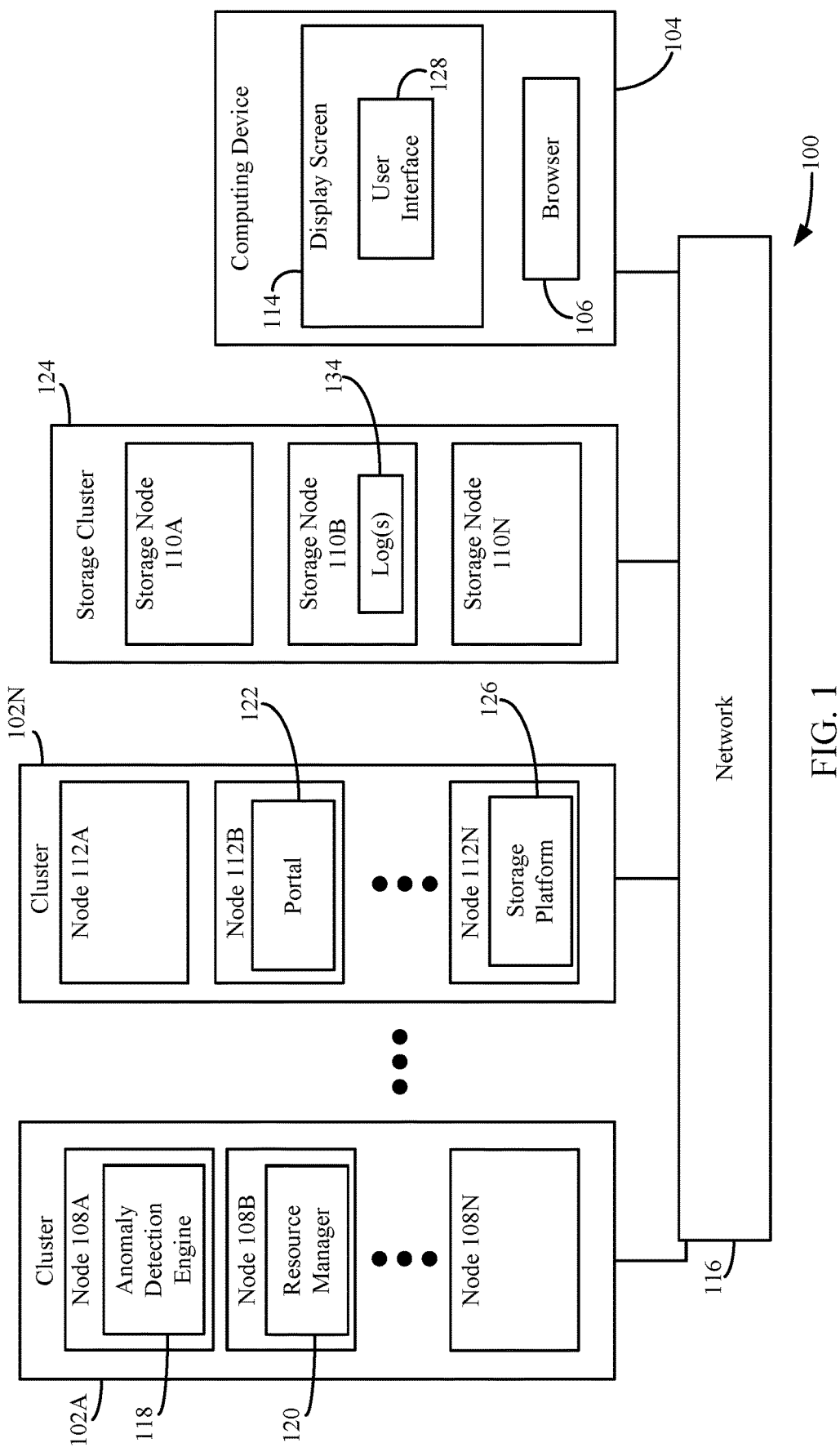
FIG. 1 shows a block diagram of an example network-based computing system configured to detect anomalous behavior with respect to control plane operations in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Modern fully-managed cloud databases, such as Azure® Cosmos DB™ owned by Microsoft® Corporation of Redmond, Washington, are designed for application development and offer a variety of advanced features. Such databases offer massive built-in capabilities, such as data replication and multi-region writes, which automatically work behind the scenes, unattended by the users.

Intrusion detection services are a common and important security feature for cloud services, which monitor data plane traffic (e.g., application traffic, load balancing traffic, etc.) and generate mitigatable alerts on anomalous data traffic patterns, such as an anomalous amount of extracted data, access from an anomalous source, etc.

Intrusion detection services that monitor data plane traffic are challenging to implement for several reasons. For example, in modern databases, such as Azure® Cosmos DB™, individual identities (such as a user) and verbose commands (such as SQL queries) are not used for data plane operations. This makes suspicious behavior detection challenging, as most attacks are very similar to normal usage (such as operations for data exfiltration or deletion). In case of a data plane attack (such as data exfiltration for theft, data encryption for ransomware, etc.), post-factum detection is not efficient because the damage is already done and mostly irreversible.

Embodiments described herein are directed to detecting mass control plane operations (e.g., resource management operations, resource configuration operations, resource access enablement operations, etc.), which may be indicative of anomalous (or malicious) behavior. For example, one or more logs are received that specify a plurality of access enablement operations performed with respect to an entity. The log(s) are analyzed to identify a number of access enablement operations that occurred in a particular time period. A determination is made as to whether the identified number of access enablement operations meet a threshold condition (e.g., to determine whether an unusually high number of access enablement operations occurred in a given time period). Based on the threshold condition being met, a determination is made that anomalous behavior has occurred with respect to the entity. Responsive to determining that the potentially anomalous behavior has occurred, a mitigation action may be performed that mitigates the behavior.

Such techniques address the problems described above with reference to data plane traffic monitoring. For instance, in accordance with the embodiments described herein, anomaly detection is utilized to detect suspicious authentication operations and alert a user before the actual payload of the attack is executed (i.e., before a malicious actor has the opportunity to access data and carry out the attack). Accordingly, the embodiments described herein provide improvements in other technologies, namely data security. For instance, the techniques described herein advantageously detect anomalous (e.g., malicious) control plane operations, thereby enabling an attack to be prevented in the very early stages thereof. This advantageously prevents access to personal and/or confidential information associated with the resource, as well as preventing access to the network and computing entities (e.g., computing devices, virtual machines, etc.) on which the resource is provided. In addition, by mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

For example, FIG. 1 shows a block diagram of an example network-based computing system 100 configured to detect anomalous behavior with respect to control plane operations, according to an example embodiment. As shown in FIG. 1, system 100 includes a plurality of clusters 102A and 102N, a storage cluster 124, and a computing device 104. Each of clusters 102A and 102N, storage cluster 124, and computing device 104 are communicatively coupled to each other via network 116. Network 116 may comprise one or more networks such as local area networks (LANs), wide area networks (WANs), enterprise networks, the Internet, etc., and may include one or more of wired and/or wireless portions.

Clusters 102A and 102N and/or storage cluster 124 may form a network-accessible server set (e.g., a cloud-based environment or platform). Each of clusters 102A and 102N may comprise a group of one or more nodes (also referred to as compute nodes) and/or a group of one or more storage nodes. For example, as shown in FIG. 1, cluster 102A includes nodes 108A-108N and cluster 102N includes nodes 112A-112N. Each of nodes 108A-108N and/or 112A-112N are accessible via network 116 (e.g., in a "cloud-based" embodiment) to build, deploy, and manage applications and services. Storage cluster 124 comprises one or more storage nodes 110A-110N. Each of storage node(s) 110A-110N comprises a plurality of physical storage disks that are accessible via network 116 and is configured to store data associated with the applications and services managed by nodes 108A-108N and/or 112A-112N.

In an embodiment, one or more of clusters 102A and 102N and/or storage cluster 124 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A and/or 102N and/or storage cluster 124 may be a datacenter in a distributed collection of datacenters. In accordance with an embodiment, computing system 100 comprises part of the Microsoft® Azure® cloud computing platform, owned by Microsoft Corporation of Redmond, Washington, although this is only an example and not intended to be limiting.

Each of node(s) 108A-108N and 112A-112N may comprise one or more server computers, server systems, and/or computing devices. Each of node(s) 108A-108N and 112A-112N may be configured to execute one or more software applications (or "applications") and/or services and/or manage hardware resources (e.g., processors, memory, etc.), which may be utilized by users (e.g., customers) of the network-accessible server set. Node(s) 108A-108N and 112A-112N and storage node(s) 110A-110N may also be configured for specific uses. For example, as shown in FIG. 1, node 108A may be configured to execute an anomaly detection engine 118, node 108B may be configured to execute a resource manager 120, node 112B may be configured to execute a portal 122, and node 112N may be configured to execute and/or host a storage platform 126. It is noted that instances of anomaly detection engine 118, resource manager 120, portal 122, and/or storage platform 126 may be executing on other node(s) (e.g., node(s) 108B-108N and/or node(s) 112A-112N) in lieu of or in addition to nodes 108A, 108B, 112B and 112N, respectively. It is further noted that one or more of anomaly detection engine 118, resource manager 120, portal 122, and storage platform 126 may be incorporated with each other.

In accordance with an embodiment, storage platform 126 is a distributed, multi-modal database service. Storage platform 126 may be configured to configured to execute statements to create, modify, and delete data stored in an associated database (e.g., maintained by one or more of storage node(s) 110A-110N) based on an incoming query, although the embodiments described herein are not so limited. Queries may be user-initiated or automatically generated by one or more background processes. Such queries may be configured to add data file(s), merge data file(s) into a larger data file, re-organize (or re-cluster) data file(s) (e.g., based on a commonality of data file(s)) within a particular set of data file, delete data file(s) (e.g., via a garbage collection process that periodically deletes unwanted or obsolete data), etc. An example of a distributed, multi-modal database service includes, but is not limited to Azure® Cosmos DB™ owned by Microsoft® Corporation of Redmond, Washington.

In accordance with another embodiment, storage platform 126 is a distributed file system configured to store large amounts of unstructured data (e.g., via storage node(s) 110A-110N). Examples of distributed file systems include, but are not limited to Azure® Data Lake owned by Microsoft® Corporation of Redmond, Washington, Azure® Blob Storage owned by Microsoft® Corporation of Redmond, Washington, etc.

A user may be enabled to utilize the applications and/or services (e.g., storage platform 126 and/or anomaly detection engine 118) offered by the network-accessible server set via portal 122. For example, a user may be enabled to utilize the applications and/or services offered by the network-accessible server set by signing-up with a cloud services subscription with a service provider of the network-accessible server set (e.g., a cloud service provider). Upon signing up, the user may be given access to portal 122. A user may access portal 122 via computing device 104. As shown in FIG. 1, computing device 104 includes a display screen 114 and a browser application (or "browser") 106. A user may access portal 122 by interacting with an application executing on computing device 104 capable of accessing portal 122. For example, the user may use browser 106 to traverse a network address (e.g., a uniform resource locator) to portal 122, which invokes a user interface 128 (e.g., a web page) in a browser window rendered on computing device 104. The user may be authenticated (e.g., by requiring the user to enter user credentials (e.g., a user name, password, PIN, etc.)) before being given access to portal 122. Computing device 104 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Upon being authenticated, the user may utilize portal 122 to perform various cloud management-related operations (also referred to as "control plane" operations). Such operations include, but are not limited to, allocating, modifying, and/or deallocating cloud-based resources, building, managing, monitoring, and/or launching applications (e.g., ranging from simple web applications to complex cloud-based applications), configuring one or more of node(s) 108A-108N and 112A-112N to operate as a particular server (e.g., a database server, OLAP (Online Analytical Processing) server, etc.), etc. Examples of cloud-based resources include, but are not limited to virtual machines, storage disks (e.g., maintained by storage node(s) 110A-110N), web applications, database servers, data objects (e.g., data file(s), table(s), structured data, unstructured data, etc.) stored via the database servers, etc. Portal 122 may be configured in any manner, including being configured with any combination of text entry, for example, via a command line interface (CLI), one or more graphical user interface (GUI) controls, etc., to enable user interaction.

Resource manager 120 may be configured to generate a log (also referred to as an "activity log") each time a user logs into his or her cloud services subscription via portal 122. The log (shown as log(s) 134) may be stored in one or more of storage node(s) 110A-110N (e.g., storage node 110B). The period in which a user has logged into and logged off from portal 122 may be referred to as a portal session. Each log may identify control plane operations that have occurred during a given portal session, along with other characteristics associated with the control plane operations. For example, each log of log(s) 134 may specify an identifier for the control plane operation, an indication as to whether the control plane operation was successful or unsuccessful, an identifier of the resource that is accessed or was attempted to be accessed, a time stamp indicating a time at which the control plane operation was issued, a network address from which the control plane operation was issued (e.g., the network address associated with computing device 104), an application identifier that identifies an application (e.g., portal 122, browser 106, etc.) from which the control plane operation was issued, a user identifier associated with a user (e.g., a username by which the user logged into portal 122) that issued the control plane operation, an identifier of the cloud-based subscription from which the resource was accessed or attempted to be accessed, a type of the entity (e.g., a user, a role, a service principal, etc.) that issued the control plane operation, a type of authentication scheme (e.g., password-based authentication, certificate-based authentication, biometric authentication, token-based authentication, multi-factor authentication, etc.) utilized by the entity that issued the control plane operation, an autonomous system number (ASN) associated with the entity that issued the control plane operation (e.g., a globally unique identifier that defines a group of one or more Internet protocol (IP) prefixes utilized by a network operator that maintains a defined routing policy), etc. An example of resource manager 120 includes, but is not limited to Azure® Resource Manager™ owned by Microsoft® Corporation, although this is only an example and is not intended to be limiting.

In accordance with an embodiment, storage platform 126 is configured to provide access to resources maintained thereby via one or more access keys. Each of the access key(s) may be cryptographic access key(s) (e.g., a string of numbers and/or characters, for example, a 512-bit string) that are required for authentication when granting an entity access to one or more resources. Access key(s) are granted to an entity by resource manager 120. For instance, when a user, via portal 122, attempts to access a resource managed by storage platform 126, portal 122 may send a request for an access key that enables portal 122 to access the resource. The request is referred herein as an access enablement operation, as it is enables access to a resource. An access enablement operation is another example of a control plane operation. In accordance with an embodiment in which computing system 100 comprises part of the Microsoft® Azure® cloud computing platform, the request is a List Keys application programming interface (API) call. The request may specify, among other things, an identifier of the user or role that is attempting to access the resource, an identifier of the resource, and an identifier of the cloud-based subscription.

Resource manager 120 is configured to determine whether the requesting entity has permissions to access the resource(s) that the entity is attempting to access. For instance, resource manager 120 may include role-based access control functionality (RBAC). Such functionality may be used to ensure that only certain users, certain users assigned to certain roles within an organization, or certain cloud-based subscriptions are able to manage particular resources. For example, only certain users, roles, and/or subscriptions may be enabled to interact with resource manager 120 for the purposes of adding, deleting, modifying, configuring, or managing certain resources. Upon determining that the entity (e.g., a user, role, or subscription) is authorized to access a particular resource, resource manager 120 may send a response to portal 122 that includes the access key that enables access to that resource. Upon receiving the response, portal 122 may send a request to storage platform 126 that comprises the access key and an identifier of the resource attempting to be accessed. Storage platform 126 determines whether the request comprises a valid access key for the resource being attempted to be accessed. Upon determining that the request comprises a valid access key, storage platform 126 provides portal 122 access to the resource, and the resource may become viewable and/or accessible via portal 122.

The access keys maintained by resource manager 120 and the request sent by portal 122 to storage platform 126 do not specify any information that is specific to the entity that is attempting to access a resource. For instance, the access keys and the request do not specify any credentials (e.g., usernames, passwords, etc.) or user-specific identifiers. Contrast this to traditional database applications, where requests for resources maintained thereby specify user-specific information that identifies the user that is attempting access to such resources. Accordingly, storage platform 126 is unaware of which entity is attempting to access resource(s) maintained thereby. Instead, storage platform 126 is simply concerned with determining whether a valid access key is provided when accessing a particular resource.

Anomaly detection engine 118 may be configured to analyze log(s) 134 comprising control plane operations and assess whether such operations are indicative of anomalous or malicious behavior (e.g., a pattern of control plane operations that deviate from what is standard, normal, or expected). In particular, anomaly detection engine 118 may be configured to detect mass attempts and/or executions of control plane operations that occur in a particular time period or window. The mass attempt of control plane operations may be indicative anomalous behavior. It is noted that anomaly detection engine 118 may be configured to analyze certain types of control plane operations (and not all control plane operations) that are more likely to be representative of malicious behavior. Such operations include, but are not limited to, access enablement operations (e.g., requests for access keys maintained by resource manager 120), creating and/or activating new (or previously-used) user accounts, service principals, groups, cloud-based subscriptions, etc., changing user or group attributes, permission settings, security settings (e.g., multi-factor authentication settings), federation settings, data protection (e.g., encryption) settings, elevating another user account's privileges (e.g., via an admin account), retriggering guest invitation emails, etc.

To detect anomalous behavior, anomaly detection engine 118 may comprise a spike detection model that is configured to analyze log(s) 134 and detect spikes in certain control plane operations (e.g., an abnormally large number of such control plane operations) based on the analysis. For instance, the spike detection model may be configured to determine whether an abnormal number of control plane operations that occurred in a particular time period meets a threshold condition (e.g., whether a certain number of control plane operations occurred during the particular time period). The spike detection model may be configured to utilize statistical modeling-based techniques (e.g., simple or polynomial regression-based statistical modeling techniques, logistic regression-based statistical modeling techniques, re-sampling-based statistical modeling techniques, time series analysis-based techniques (e.g., AutoRegressive Integrated Moving Average (ARIMA), decomposition model-based techniques), etc.). Alternatively, the spike detection model may utilize machine learning-based techniques to detect spikes in control plane operations (e.g., an unsupervised machine learning algorithm or a neural network-based machine learning algorithm (e.g., a recurrent neural network (RNN)-based machine learning algorithm, such as, but not limited to a long short-term memory (LSTM)-based machine learning algorithm)). In accordance with an embodiment, anomaly detection engine 118 may be implemented in and/or incorporated with Microsoft® Defender for Cloud™ published by Microsoft® Corp, Microsoft® Sentinel™ published by Microsoft® Corp., etc.

In an example in which the spike detection model utilizes a statistical modeling-based technique, anomaly detection engine 118 may analyze log(s) 134 over time to determine an average number of control plane operations that occur over various time periods (e.g., hourly, daily, weekly, monthly, etc.). For instance, anomaly detection engine 118 may determine various statistics associated with the control lane operations specified in log(s) 134 for a given time period (e.g., the average number of control plane operations specified in log(s) 134 for a given time period). Anomaly detection engine 118 may analyze log(s) 134 that were generated for periods of time in which it was known that no anomalous behavior had occurred. This way, the determined number of control plane operations is representative of normal, non-anomalous behavior. Anomaly detection engine 118 may generate the spike detection model based on the determined statistics. The spike detection model may be configured to operate with respect to different scopes (e.g., user-level control plane operations, role-level control plane operations, or subscription-level control plane operations). For instance, the spike detection model may be configured to analyze log(s) 134 associated with a particular user to determine whether that user's account is exhibiting suspicious behavior, may analyze log(s) 134 associated with a particular role to determine whether that role is exhibiting suspicious behavior, or may analyze log(s) 134 associated with a subscription (which may be associated with a plurality of users and/or roles) to determine whether the subscription (as a whole) is exhibiting suspicious behavior.

After generating the spike detection model, anomaly detection engine 118 may provide subsequently-generated log(s) 134 thereto, and the spike detection model determines whether a relatively high number of control plane operations (e.g., five standard deviations above the determined average number) for a given time period (e.g., an hour, a day, a week, etc.) were performed.

In an embodiment in which the spike detection model is a machine learning model, the spike detection model may be generated based on a training process, where log(s) 134 are analyzed to determine relationships with respect to the control plane operations specified thereby. For instance, the machine learning model may learn the average number of control plane operations for various time periods and/or determine one or more seasonality patterns with respect to the control plane operations. For instance, the machine learning model may determine that non-anomalous control plane operations occur more frequently during the weekday versus the weekend, etc. The machine learning model may determine whether a number of control plane operations that occurred within a particular time period is anomalous in accordance with the learned average and/or seasonality pattern(s).

Utilizing the spike detection model, anomaly detection engine 118 may be configured to detect an unusually high level of successful executions of control plane operations (e.g., operations that executed successfully, for example, an access enablement operation that resulted in an access key being provided). For example, a spike in successful control plane operations can indicate anomalous massive access to data, where a malicious actor utilizes his window of opportunity to maximize his gains. The spike detection model may be configured to detect that a number of successful control plane operations that occurred in a particular time period meets a threshold condition. The threshold condition may be whether the number of successful control plane operations that occurred in a particular time period is greater than the determined average number of successful control plane operations that occurred in that time period. Responsive to determining that the threshold condition is met, anomaly detection engine 118 may determine that anomalous behavior has occurred with respect to the entity of the storage platform being analyzed (e.g., a user, role, or subscription).

Utilizing the spike detection model, anomaly detection engine 118 may also be configured to detect an unusually high level of unsuccessful executions of control plane operations (e.g., operations that executed unsuccessfully, for example, an access enablement operation that resulted in an access key being denied). For example, a spike in unsuccessful control plane operations can indicate anomalous blind access attempts, for example, triggered during a reconnaissance stage of an attack, where a malicious actor blindly searches for an entry point without knowledge of the structure of the data. A successful operation coming after a sequence of failed attempts can indicate a breach, so this scenario may be even more suspicious. The spike detection model may be configured to detect that a number of unsuccessful control plane operations that occurred in a particular time period meets a threshold condition. The threshold condition may be whether the number of unsuccessful control plane operations that occurred in a particular time period is greater than the determined average number of unsuccessful control plane operations that occurred in that time period. Responsive to determining that the threshold condition is met, anomaly detection engine 118 may determine that anomalous behavior has occurred with respect to the entity of the storage platform being analyzed (e.g., a user, role, or subscription). The foregoing technique advantageously enables a malicious attack to be detected before the data attempting to be accessed is actually accessed.

In accordance with an embodiment, the threshold condition may be a predetermined value (e.g., the determined average value representative of successful or unsuccessful executions of control plane operations). In accordance with such an embodiment, anomaly detection engine 118 may be configured in one of many ways to determine that the threshold condition has been met. For instance, anomaly detection engine 118 may be configured to determine that the threshold condition has been met if the number of control plane operations during a particular time period is less than, less than or equal to, greater than or equal to, or greater than the predetermined value.

Responsive to determining that anomalous behavior has occurred, anomaly detection engine 118 may cause a mitigation action to be performed that mitigates the anomalous behavior. For example, anomaly detection engine 118 may issue a notification (e.g., to an administrator) that indicates anomalous behavior has been detected, provides a description of the anomalous behavior (e.g., by specifying the control plane operations determined to be anomalous, specifying the IP address(es) from which the control plane operations were initiated, times at which the control plane operations occurred, an identifier of the entity that initiated the control plane operations, an identifier of the resource(s) that were accessed or attempted to be accessed, etc.), cause an access key utilized to access the resource(s) to be changed, or cause access to the resource(s) to be restricted for the entity. The notification may comprise a short messaging service (SMS) message, a telephone call, an e-mail, a notification that is presented via an incident management service, a security tool, portal 122, etc. Anomaly detection engine 118 may cause an access key utilized to access the resource(s) to be changed by sending a command to resource manager 120. For example, resource manager 120 may maintain a plurality of keys for a given entity (e.g., a primary key and a secondary key). Responsive to receiving the command, resource manager 120 may rotate the key to be utilized for accessing the resource (e.g., switch from using the primary key to using the secondary key). Anomaly detection engine 118 may cause access to a resource to be restricted (e.g., by limiting or preventing access) for the entity attempting access by sending a command to resource manager 120 that causes resource manager 120 to update access and/or permission settings for the entity with regards to the resource. It is noted that notifications may be issued responsive to detecting mass control plane operations regardless of whether such operations are actually anomalous or malicious. This way, an administrator may decide for himself or herself as to whether the detected operations are anomalous or malicious based on an analysis thereof.

Figure 2:
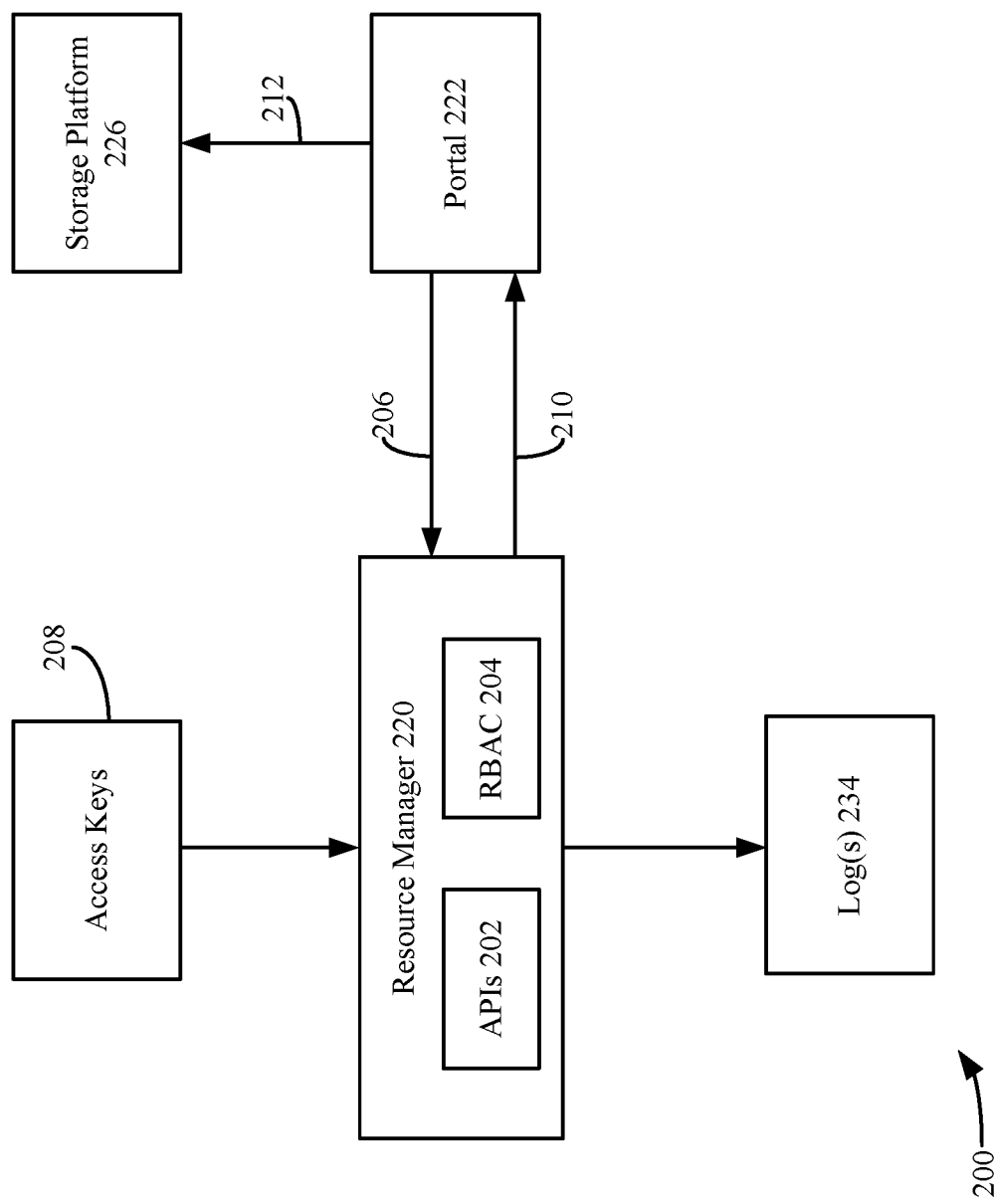
FIG. 2 depicts a block diagram of a system for logging control plane operations in accordance with an example embodiment.

FIG. 2 depicts a block diagram of a system 200 for logging control plane operations, according to an example embodiment. As shown in FIG. 2, system 200 comprises a resource manager 220, a portal 222, and a storage platform 226. Resource manager 220, portal 222, and storage platform 226 are examples of resource manager 120, portal 122, and storage platform 126, as respectively described above with reference to FIG. 1. As also shown in FIG. 2, resource manager 220 comprises application programming interfaces (APIs) 202 and RBAC functionality 204. APIs 202 may be utilized to request and manage resources, for example, made available via storage platform 226. APIs 202 may also be utilized to request access key(s) for access to resources. In one implementation, such APIs 202 may include REST APIs, although this is only a non-limiting example. RBAC functionality 204 may be used to ensure that only certain users, certain users assigned to certain roles within an organization, or certain cloud-based subscriptions are able to manage particular resources. For example, only certain users, roles, and/or subscriptions may be enabled to interact with resource manager 220 for the purposes of adding, deleting, modifying, configuring, or managing certain resources. RBAC functionality 204 may comprise a data structure (e.g., a table) that maps permissions to various users, roles, and/or cloud-based subscriptions.

When a user, via portal 222, attempts to access a resource managed by storage platform 226, portal 222 may send a request 206 for an access key that enables portal 222 to access the resource (i.e., portal 222 sends an access enablement operation) utilizing APIs 202. In accordance with an embodiment in which computing system 200 comprises part of the Microsoft® Azure® cloud computing platform, request 206 is a call to a List Keys API call, which is an example of APIs 202. Request 206 may specify, among other things, an identifier of the user or role that is attempting to access the resource, an identifier of the resource, and an identifier of the cloud-based subscription.

Resource manager 220 is configured to determine whether the requesting entity has permissions to access the resource that the entity is attempting to access. For instance, resource manager 220 may utilize RBAC functionality 204 to determine whether the requesting entity is authorized to access the resource. may include role-based access control functionality. Upon determining that the entity (e.g., a user, role, or subscription) is authorized to access the resource, resource manager 220 may retrieve the access key associated with the entity and the resource from a data store (e.g., maintained via storage node(s) 110A-110N) configured to store a plurality of access keys 208. Resource manager 200 provides the retrieved access key to portal via a response 210 that includes the access key that enables access to that resource.

Resource manager 220 logs request 206 and characteristics thereof in a log of log(s) 234. For instance, the log may store an identifier for request 206, an indication as to whether request 206 was successful or unsuccessful (i.e., whether an access key was granted for request 206), an identifier of the resource that is accessed or was attempted to be accessed, a time stamp indicating a time at which the request 206 was issued and/or completed, a network address from which request 206 was issued (e.g., the network address associated with the computing device from which portal 222 was accessed), an application identifier that identifies an application (e.g., portal 222) from which request 206 was issued, a user identifier associated with a user (e.g., a username by which the user logged into portal 222) that issued request 206, an identifier of the cloud-based subscription from which the resource was accessed or attempted to be accessed, a type of the entity (e.g., a user, a role, a service principal, etc.) that issued request 206, a type of authentication scheme (e.g., password-based authentication, certificate-based authentication, biometric authentication, token-based authentication, multi-factor authentication, etc.) utilized by the entity that issued request 206, an ASN number associated with the entity that issued request 206, etc.

Upon receiving response 210, portal 222 may send a request 212 to storage platform 226 that comprises the access key and an identifier of the resource attempting to be accessed. Storage platform 226 determines whether request 212 comprises a valid access key for the resource being attempted to be accessed. Upon determining that request comprises a valid access key, storage platform 226 provides portal 222 access to the resource, and the resource may become viewable and/or accessible via portal 222. Request for data maintained by storage platform 226, such as request 212, be referred to as a data plane operation.

Figure 3:
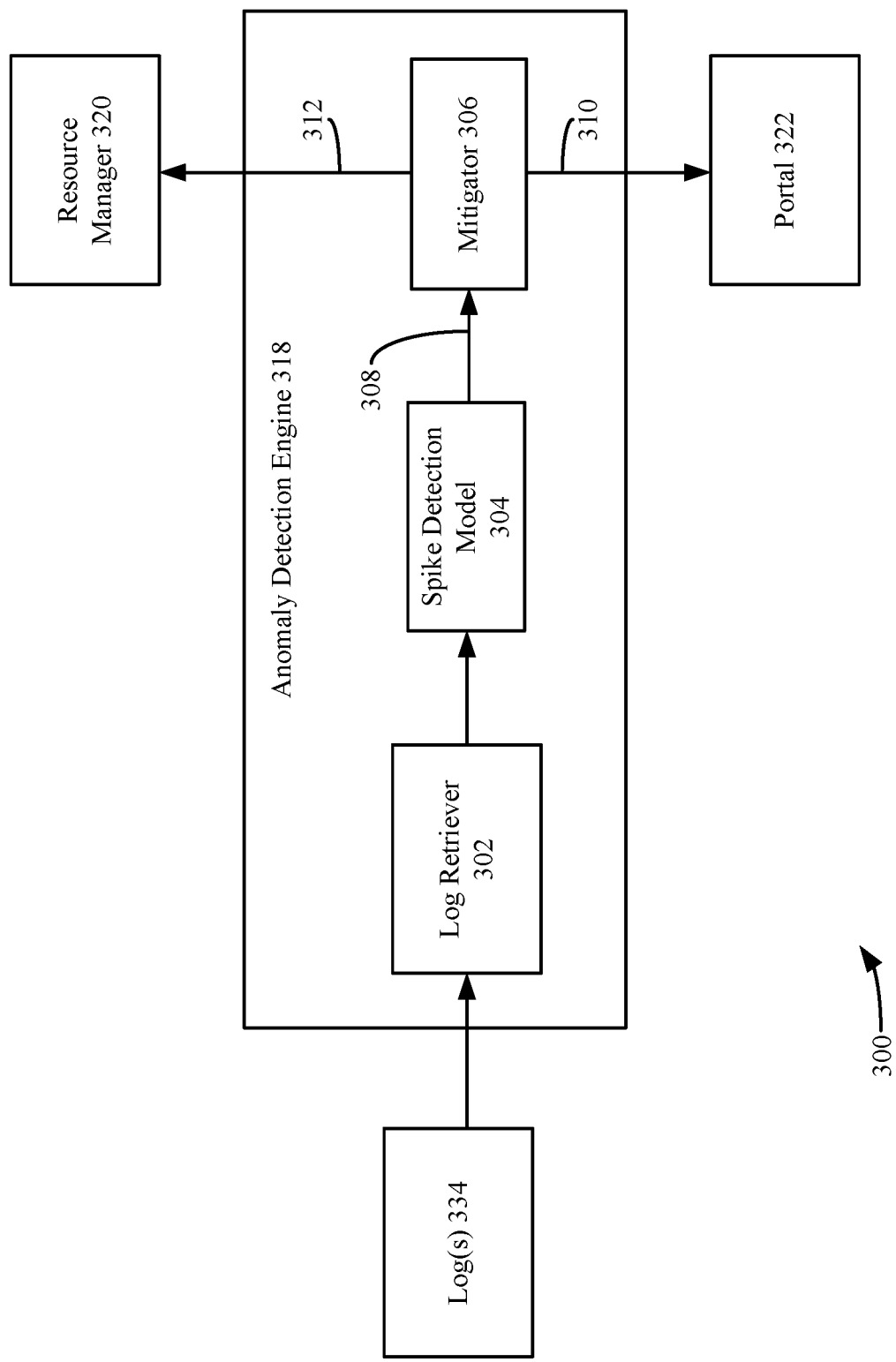
FIG. 3 shows a block diagram of a system configured to detect anomalous behavior with respect to control plane operations in accordance with an example embodiment.

FIG. 3 shows a block diagram of a system 300 configured to detect anomalous behavior with respect to control plane operations, according to an example embodiment. As shown in FIG. 3, system 300 comprises an anomaly detection engine 318, a resource manager 320, and a portal 322. Anomaly detection engine 318, resource manager 320, and portal 322 are examples of anomaly detection engine 118, resource manager, 120, and portal 122, as described above with reference to FIG. 1. As shown in FIG. 3, anomaly detection engine 318 may comprise a log retriever 302, a spike detection model 304, and a mitigator 306.

Log retriever 302 is configured to retrieve one or more logs 334, which are examples of log(s) 234, as described above with reference to FIG. 2. Log retriever 302 may be configured to retrieve log(s) 334 on a periodic basis (e.g., hourly, daily, weekly, monthly, etc.). However, it is noted that the embodiments described herein are not so limited. For instance, log retriever 302 may be configured to retrieve log(s) 334 responsive to receiving a command initiated by a user (e.g., an administrator) or another application. To retrieve log(s) 334, log retriever 302 may provide a query to a data store (e.g., a database) that stores log(s) 334. The query may specify an entity and/or a time range for log(s) 334 (e.g., the last seven days of log(s) 334 for a particular username, role, or a cloud-based subscription). The retrieved log(s) retrieved are provided to spike detection model 304.

In accordance with an embodiment in which spike detection model 304 is a machine learning-based model, the data included in retrieved log(s) may be featurized. The data may include, but is not limited to, an identifier for the control plane operation, an indication as to whether the control plane operation was successful or unsuccessful, an identifier of the resource that is accessed or was attempted to be accessed, a time stamp indicating a time at which the control plane operation was issued, a network address from which the control plane operation was issued, an application identifier that identifies an application (e.g., portal 322, etc.) from which the control plane operation was issued, a user identifier associated with a user (e.g., a username by which the user logged into portal 322) that issued the control plane operation, an identifier of the cloud-based subscription from which the resource was accessed or attempted to be accessed, a type of the entity (e.g., a user, a role, a service principal, etc.) that issued the control plane operation, a type of authentication scheme (e.g., password-based authentication, certificate-based authentication, biometric authentication, token-based authentication, multi-factor authentication, etc.) utilized by the entity that issued the control plane operation, an ASN number associated with the entity that issued the control plane operation, etc. The featurized data may take the form of one or more feature vectors, which are provided to spike detection model 304. The feature vector(s) may take any form, such as a numerical, visual and/or textual representation, or may comprise any other form suitable for representing log(s) 334. In an embodiment, the feature vector(s) may include features such as keywords, a total number of words, and/or any other distinguishing aspects relating to log(s) 334 that may be extracted therefrom. Log(s) 334 may be featurized using a variety of different techniques, including, but not limited to, time series analysis, keyword featurization, semantic-based featurization, digit count featurization, and/or n-gram-TFIDF featurization.

Spike detection model 304 is configured to analyze the log(s) retrieved by log retriever 302 (or the corresponding feature vector(s) generated therefrom) and detect spikes in certain control plane operations (e.g., an abnormally large number of such control plane operations in a given time period) based on the analysis. For instance, spike detection model 304 may be configured to determine whether an abnormal number of control plane operations that occurred in a particular time period meets a threshold condition (e.g., whether a certain number of control plane operations occurred during the particular time period). Spike detection model 304 may be configured to utilize statistical modeling-based techniques (e.g., simple or polynomial regression-based statistical modeling techniques, logistic regression-based statistical modeling techniques, re-sampling-based statistical modeling techniques, time series analysis-based techniques (e.g., AutoRegressive Integrated Moving Average (ARIMA), decomposition model-based techniques), etc.). Alternatively, the spike detection model, as described above, may utilize machine learning-based techniques to detect spikes in control plane operations (e.g., an unsupervised machine learning algorithm or a neural network-based machine learning algorithm (e.g., a recurrent neural network (RNN)-based machine learning algorithm, such as, but not limited to a long short-term memory (LSTM)-based machine learning algorithm).

To determine whether a relatively high number of (or a spike in) control plane operations has occurred during a given time period (e.g., an hour, a day, a week, etc.), spike detection model 304 may determine whether the number of control plane operations specified by the retrieved log(s) for the given time period meets a threshold condition. In accordance with an embodiment, the threshold condition is number corresponding to an N-number (e.g., 5) of standard deviations above a determined average number of control plane operations for the given time period. It is noted that this threshold condition is purely exemplary and that other threshold conditions may be utilized.

In accordance with an embodiment, spike detection model 304 is configured to detect an unusually high level of successful executions of control plane operations. For example, spike detection model 304 may determine a number of control plane operations that occurred in a given time period and that were indicated as being successful in the retrieved log(s). Spike detection model 304 may determine whether the number of successful control plane operations meets a threshold condition. The threshold condition may be whether the number of successful control plane operations that occurred in a particular time period is greater than (e.g., is an N-number of standard deviations above) the determined average number of successful control plane operations that occurred in that time period. Responsive to determining that the threshold condition is met, spike detection engine 304 may determine that anomalous behavior has occurred.

In accordance with another embodiment, spike detection model 304 is configured to detect an unusually high level of unsuccessful executions of control plane operations. For example, spike detection model 304 may determine a number of control plane operations that occurred in a given time period and that were indicated as being unsuccessful in the retrieved log(s). Spike detection model 304 may determine whether the number of unsuccessful control plane operations meets a threshold condition. The threshold condition may be whether the number of unsuccessful control plane operations that occurred in a particular time period is greater than (e.g., is an N-number of standard deviations above) the determined average number of unsuccessful control plane operations that occurred in that time period. Responsive to determining that the threshold condition is met, spike detection engine 304 may determine that anomalous behavior has occurred.

Responsive to determining that anomalous behavior has occurred, spike detection model 304 may provide a notification 308 to mitigator 306 that indicates that anomalous behavior has been detected. Responsive to receiving notification 308, mitigator 306 may cause a mitigation action to be performed that mitigates the anomalous behavior. For example, mitigator 308 may issue a notification 310 that is displayed via portal 322. Notification 310 may indicate that anomalous behavior has been detected and/or may provide a description of the anomalous behavior (e.g., by specifying the control plane operations determined to be anomalous, specifying the IP address(es) from which the control plane operations were initiated, times at which the control plane operations occurred, an identifier of the entity that initiated the control plane operations, an identifier of the resource(s) that were accessed or attempted to be accessed, etc.). Mitigator 306 may also cause an access key utilized to access the resource(s) to be changed or cause access to the resource(s) to be restricted for the entity. For instance, mitigator 306 may provide a command 312 to resource manager 320. Responsive to receiving command 312, resource manager 320 may cause an access key utilized to access the resource(s) to be changed and/or cause access to a resource to be restricted (e.g., by limiting or preventing access) for the entity attempting access by updating access and/or permission settings for the entity with regards to the resource.

Figure 4:
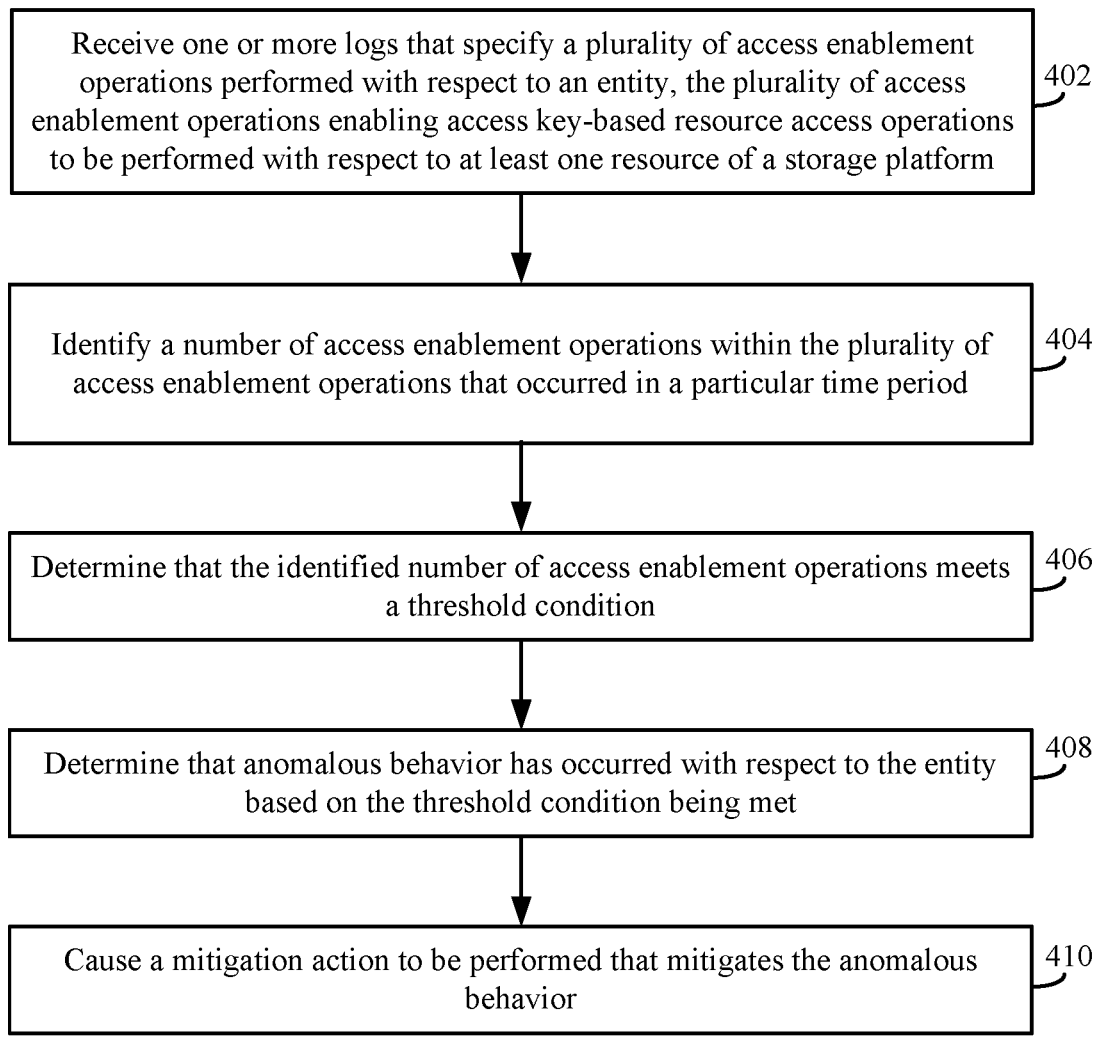
FIG. 4 shows a flowchart of a method for detecting anomalous behavior with respect to control plane operations in accordance with an example embodiment.

Accordingly, the detection of anomalous behavior with respect to control plane operations may be implemented in many ways. For example, FIG. 4 shows a flowchart 400 of a method for detecting anomalous behavior with respect to control plane operations in accordance with an example embodiment. In an embodiment, flowchart 400 may be implemented by anomaly detection engine 318 of system 300 shown in FIG. 3, although the method is not limited to that implementation. Accordingly, flowchart 400 will be described with continued reference to FIG. 3. Other structural and operational embodiments will be apparent to persons skilled in the relevant art(s) based on the discussion regarding flowchart 400 and system 300 of FIG. 3.

Flowchart 400 begins with step 402. In step 402, one or more logs that specify a plurality of access enablement operations performed with respect to an entity are received, where the plurality of access enablement operations enable access key-based resource access operations to be performed with respect to at least one resource of a storage platform. For example, with reference to FIG. 3, log retriever 302 is configured to receive log(s) 334 that specify a plurality of access enablement operations performed with respect to an entity. The plurality of access enablement operations enables access key-based resource access operations (e.g., read, write, create, update, delete, etc.) with respect to at least one resource of a storage platform (e.g., storage platform 226, as shown in FIG. 2).

In accordance with one or more embodiments, an access enablement operation of the plurality of access enablement operations comprises a request for an access key for accessing the at least one resource of the storage platform. In accordance with an embodiment in which computing system 300 comprises part of the Microsoft® Azure® cloud computing platform, the access enablement operation is a List Keys API call.

In accordance with one or more embodiments, the storage platform comprises at least one of a cloud-based distributed database or a cloud-based distributed file system configured to store unstructured data. An example of a cloud-based distributed database includes, but is not limited to Azure® Cosmos DB™ owned by Microsoft® Corporation of Redmond, Washington. Examples of cloud-based distributed file systems include, but are not limited to Azure® Data Lake owned by Microsoft® Corporation of Redmond, Washington, Azure® Blob Storage owned by Microsoft® Corporation of Redmond, Washington, etc.

In accordance with one or more embodiments, the entity comprises at least one of a user, a role to which a plurality of users is assigned, or a cloud-based subscription to which the storage platform is associated.

In step 404, a number of access enablement operations within the plurality of access enablement operations that occurred in a particular time period is identified. For example, with reference to FIG. 3, spike detection model 304 identifies a number of access enablement operations within the plurality of access enablement operations (as specified via log(s) 334) that occurred in a particular time period.

In step 406, a determination is made that the identified number of access enablement operations meets a threshold condition. For example, with reference to FIG. 3, spike detection model 304 determines that the identified number of access enablement operations meets a threshold condition.

In accordance with one or more embodiments, the threshold condition is whether the identified number of access enablement operations for the particular time period exceeds an average number of access enablement operations that typically occur for the particular time period.

In step 408, a determination is made that anomalous behavior has occurred with respect to the entity based on the threshold condition being met. For example, with reference to FIG. 3, spike detection model 304 determines that anomalous behavior has occurred with respect to the entity based on the threshold condition being met. Spike detection model 304 may provide notification 308 to mitigator 306 that indicates that anomalous behavior has been detected.

In step 410, responsive to determining that anomalous behavior has occurred, a mitigation action is caused to be performed that mitigates the anomalous behavior. For example, with reference to FIG. 3, responsive to receiving notification 308, mitigator 306 causes a mitigation action to be performed that mitigates the anomalous behavior.

In accordance with one or more embodiments, causing the mitigation action to be performed comprises at least one of providing a notification that indicates that the anomalous behavior was detected, causing an access key utilized to access the at least one resource to be changed, or causing access to the at least one resource to be restricted for the entity. For example, with reference to FIG. 3, mitigator 306 may provide a notification 310 to portal 322 that indicates that the anomalous behavior was detected. In another example, mitigator 306 may provide command 312 to resource manager 320 that instructs resource manager 320 to change the access key utilized to access the at least one resource and/or instructs resource manager 320 to restrict access for the entity to the at least one resource.

Figure 5:
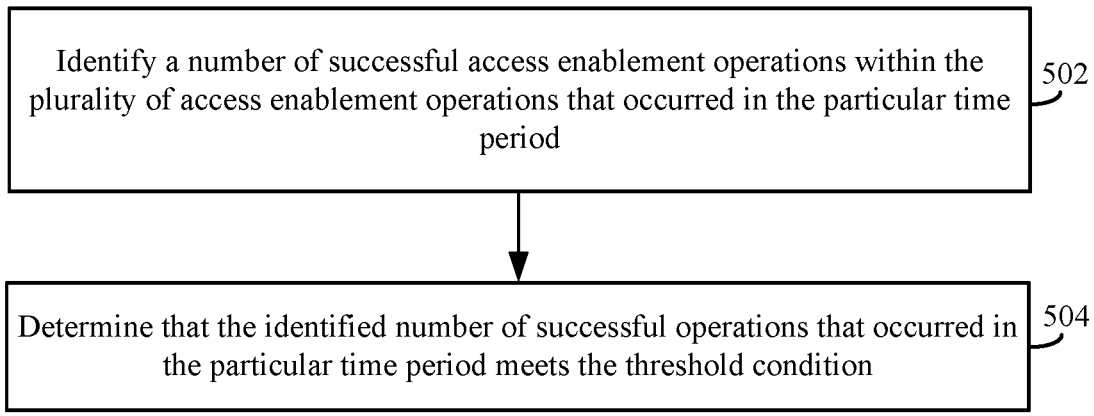
FIG. 5 shows a flowchart of a method for determining that an anomalous behavior has occurred with respect to successful control plane operations in accordance with an example embodiment.

FIG. 5 shows a flowchart 500 of a method for determining that an anomalous behavior has occurred with respect to successful control plane operations in accordance with an example embodiment. In an embodiment, flowchart 500 may be implemented by anomaly detection engine 318 of system 300 shown in FIG. 3, although the method is not limited to that implementation. Accordingly, flowchart 500 will be described with continued reference to FIG. 3. Other structural and operational embodiments will be apparent to persons skilled in the relevant art(s) based on the discussion regarding flowchart 500 and system 300 of FIG. 3.

Flowchart 500 begins with step 502. In step 502, a number of successful access enablement operations within the plurality of access enablement operations that occurred in a particular time period is identified. For example, with reference to FIG. 3, spike detection model 304 identifies a number of successful access enablement operations within the plurality of access enablement operations (as specified via log(s) 334) that occurred in a particular time period.

In step 504, a determination is made that the identified successful number of access enablement operations meets a threshold condition. For example, with reference to FIG. 3, spike detection model 304 determines that the identified number of successful access enablement operations meets a threshold condition.

Figure 6:
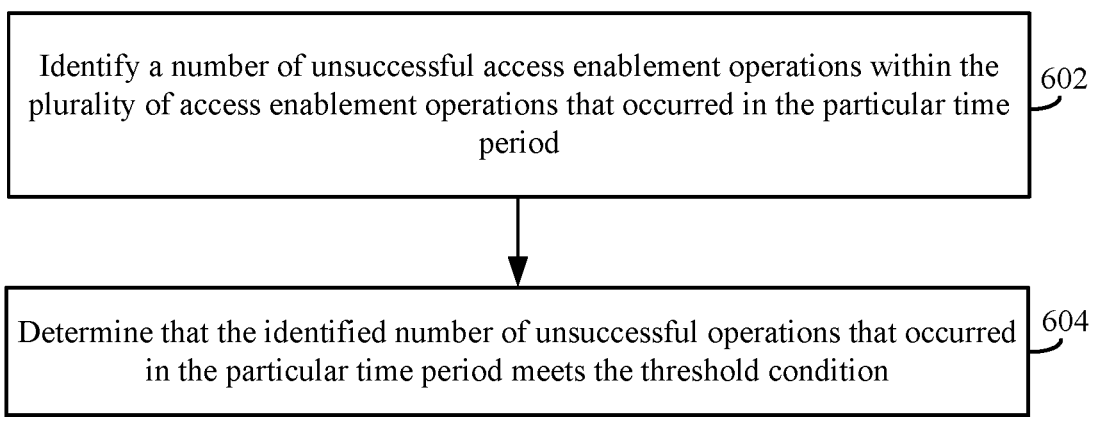
FIG. 6 shows a flowchart of a method for determining that an anomalous behavior has occurred with respect to unsuccessful control plane operations in accordance with an example embodiment.

FIG. 6 shows a flowchart 600 of a method for determining that an anomalous behavior has occurred with respect to unsuccessful control plane operations in accordance with an example embodiment. In an embodiment, flowchart 600 may be implemented by anomaly detection engine 318 of system 300 shown in FIG. 3, although the method is not limited to that implementation. Accordingly, flowchart 600 will be described with continued reference to FIG. 3. Other structural and operational embodiments will be apparent to persons skilled in the relevant art(s) based on the discussion regarding flowchart 600 and system 300 of FIG. 3.

Flowchart 600 begins with step 602. In step 602, a number of unsuccessful access enablement operations within the plurality of access enablement operations that occurred in a particular time period is identified. For example, with reference to FIG. 3, spike detection model 304 identifies a number of unsuccessful access enablement operations within the plurality of access enablement operations (as specified via log(s) 334) that occurred in a particular time period.

In step 604, a determination is made that the identified unsuccessful number of access enablement operations meets a threshold condition. For example, with reference to FIG. 3, spike detection model 304 determines that the identified number of unsuccessful access enablement operations meets a threshold condition.

III. Example Computer System Implementation

The systems and methods described above in reference to FIGS. 1-6, may be implemented in hardware, or hardware combined with one or both of software and/or firmware. For example, system 700 may be used to implement any of nodes 108A-108N and/or 112A-112N, storage node(s) 110A-110N, anomaly detection engine 118, resource manager 120, portal 122, storage platform 126, computing device 104, and/or browser 106 of FIG. 1, resource manager 220, storage platform 226, and/or portal 222 of FIG. 2, anomaly detection engine 318, resource manager 320, portal 332, log retriever 302, spike detection model 304, and/or mitigator 306 of FIG. 3, and/or any of the components respectively described therein, and flowcharts 400, 500, and/or 600 may be each implemented as computer program code/instructions configured to be executed in one or more processors and stored in a computer readable storage medium. Alternatively, any of nodes 108A-108N and/or 112A-112N, storage node(s) 110A-110N, anomaly detection engine 118, resource manager 120, portal 122, storage platform 126, computing device 104, and/or browser 106 of FIG. 1, resource manager 220, storage platform 226, and/or portal 222 of FIG. 2, anomaly detection engine 318, resource manager 320, portal 332, log retriever 302, spike detection model 304, and/or mitigator 306 of FIG. 3, and/or any of the components respectively described therein, and flowcharts 400, 500, and/or 600 may be implemented as hardware logic/electrical circuitry. In an embodiment, any of nodes 108A-108N and/or 112A-112N, storage node(s) 110A-110N, anomaly detection engine 118, resource manager 120, portal 122, storage platform 126, computing device 104, and/or browser 106 of FIG. 1, resource manager 220, storage platform 226, and/or portal 222 of FIG. 2, anomaly detection engine 318, resource manager 320, portal 332, log retriever 302, spike detection model 304, and/or mitigator 306 of FIG. 3, and/or any of the components respectively described therein, and flowcharts 400, 500, and/or 600 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
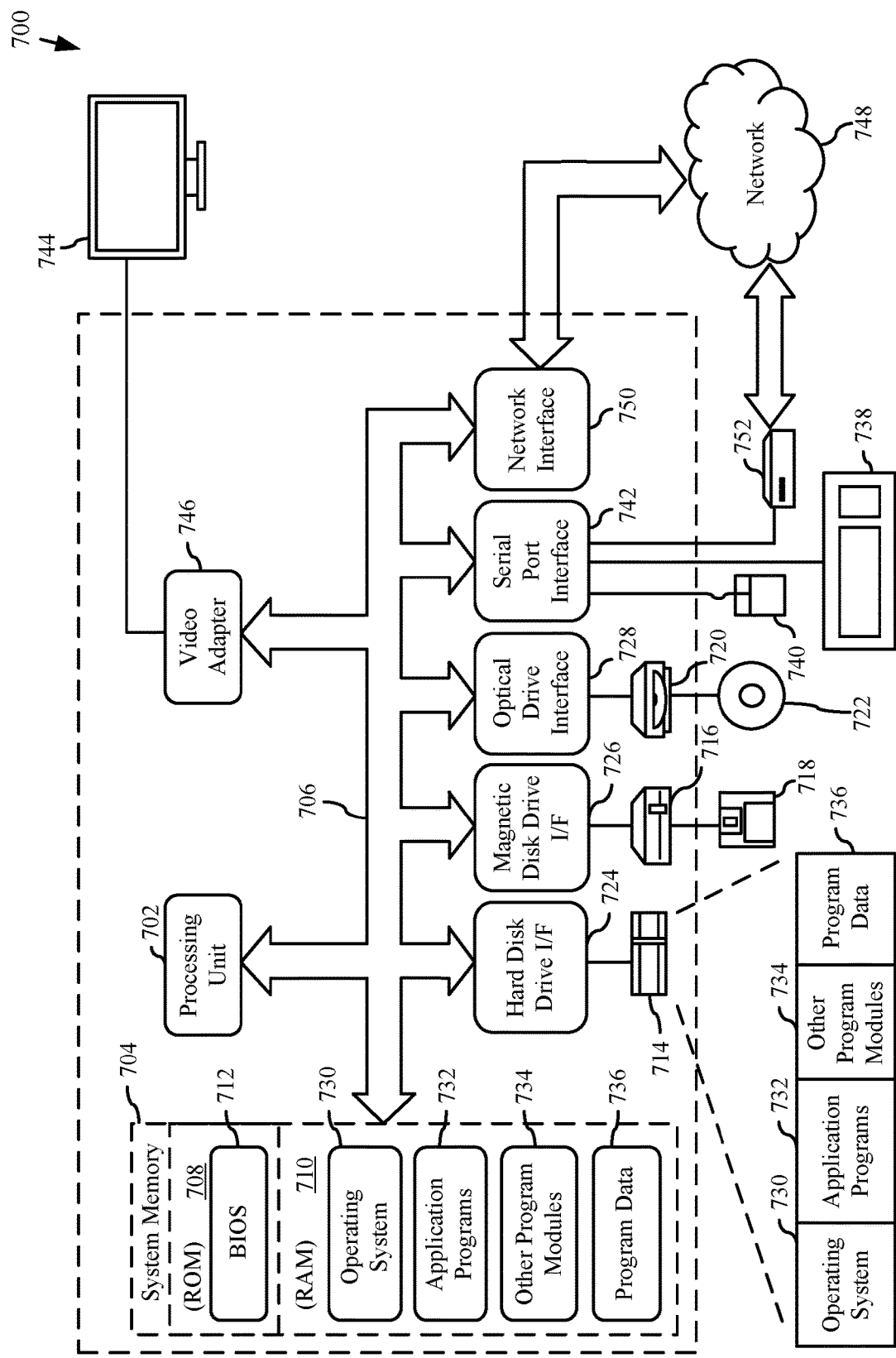
FIG. 7 is a block diagram of an example processor-based computer system that may be used to implement various embodiments.

FIG. 7 depicts an exemplary implementation of a computing device 700 in which embodiments may be implemented, including any of nodes 108A-108N and/or 112A-112N, storage node(s) 110A-110N, anomaly detection engine 118, resource manager 120, portal 122, storage platform 126, computing device 104, and/or browser 106 of FIG. 1, resource manager 220, storage platform 226, and/or portal 222 of FIG. 2, anomaly detection engine 318, resource manager 320, portal 332, log retriever 302, spike detection model 304, and/or mitigator 306 of FIG. 3, and/or any of the components respectively described therein, and flowcharts 400, 500, and/or 600. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing the systems described above, including the embodiments described above with reference to FIGS. 1-6.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, a virtual keyboard, by providing a tap input (where a user lightly presses and quickly releases display screen 744), by providing a "touch-and-hold" input (where a user touches and holds his finger (or touch instrument) on display screen 744 for a predetermined period of time), by providing touch input that exceeds a predetermined pressure threshold, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to generally refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including system memory 704 of FIG. 7). Such computer-readable storage media are distinguished from and non-overlapping with communication media and propagating signals (do not include communication media and propagating signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 752, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A computer system is described herein. The computer system includes: at least one processor circuit; and at least one memory that stores program code configured to be executed by the at least one processor circuit, the program code comprising: an anomaly detection engine configured to: receive one or more logs that specify a plurality of access enablement operations performed with respect to an entity, the plurality of access enablement operations enabling access key-based resource access operations to be performed with respect to at least one resource of a storage platform; identify a number of access enablement operations within the plurality of access enablement operations that occurred in a particular time period; determine that the identified number of access enablement operations meets a threshold condition; determine that anomalous behavior has occurred with respect to the entity based on the threshold condition being met; and responsive to determining that anomalous behavior has occurred, cause a mitigation action to be performed that mitigates the anomalous behavior.

In one implementation of the foregoing computer system, the anomaly detection engine is configured to identify the number of access enablement operations within the plurality of access enablement operations that occurred in a particular time period by identifying a number of successful access enablement operations within the plurality of access enablement operations that occurred in the particular time period; and the anomaly detection engine is configured to determine that the identified number of access enablement operations meets the threshold condition by determining that the identified number of successful operations that occurred in the particular time period meets the threshold condition.

In one implementation of the foregoing computer system, the anomaly detection engine is configured to identify the number of access enablement operations within the plurality of access enablement operations that occurred in a particular time period by identifying a number of unsuccessful access enablement operations within the plurality of access enablement operations that occurred in the particular time period; and the anomaly detection engine is configured to determine that the identified number of access enablement operations meets the threshold condition by determining that the identified number of unsuccessful operations that occurred in the particular time period meets the threshold condition.

In one implementation of the foregoing computer system, an access enablement operation of the plurality of access enablement operations comprises a request for an access key for accessing the at least one resource of the storage platform.

In one implementation of the foregoing computer system, the storage platform comprises at least one of: a cloud-based distributed database; or a cloud-based distributed file system configured to store unstructured data.

In one implementation of the foregoing computer system, the entity comprises at least one of: a user; a role to which a plurality of users is assigned; or a cloud-based subscription to which the storage platform is associated.

In one implementation of the foregoing computer system, the anomaly detection engine is configured to cause the mitigation action to be performed that mitigates the anomalous behavior by performing at least one of: providing a notification that indicates that the anomalous behavior was detected; causing an access key utilized to access the at least one resource to be changed; or causing access to the at least one resource to be restricted for the entity.

A method performed by a computing system is also disclosed. The method includes: receiving a log specifying a plurality of access enablement operations performed with respect to an entity, the plurality of access enablement operations enabling access key-based resource access operations to be performed with respect to at least one resource of a storage platform; identifying a number of access enablement operations within the plurality of access enablement operations that occurred in a particular time period; determining that the identified number of access enablement operations meets a threshold condition; determining that anomalous behavior has occurred with respect to the entity based on the threshold condition being met; and responsive to determining that anomalous behavior has occurred, causing a mitigation action to be performed that mitigates the anomalous behavior.

In one implementation of the foregoing method, identifying the number of access enablement operations within the plurality of access enablement operations that occurred in the particular time period comprises: identifying a number of successful access enablement operations within the plurality of access enablement operations that occurred in the particular time period; and determining that the identified number of access enablement operation meets the threshold condition comprises: determining that the identified number of successful operations that occurred in the particular time period meets the threshold condition.

In one implementation of the foregoing method, identifying the number of access enablement operations within the plurality of access enablement operations that occurred in the particular time period comprises: identifying a number of unsuccessful access enablement operations within the plurality of access enablement operations that occurred in the particular time period; and determining that the identified number of access enablement operation meets the threshold condition comprises: determining that the identified number of unsuccessful operations that occurred in the particular time period meets the threshold condition.

In one implementation of the foregoing method, an access enablement operation of the plurality of access enablement operations comprises a request for an access key for accessing the at least one resource of the storage platform.

In one implementation of the foregoing method, the storage platform comprises at least one of: a cloud-based distributed database; or a cloud-based distributed file system configured to store unstructured data.

In one implementation of the foregoing method, the entity comprises at least one of: a user; a role to which a plurality of users is assigned; or a cloud-based subscription to which the storage platform is associated.

In one implementation of the foregoing method, causing the mitigation action to be performed that mitigates the anomalous behavior comprises at least one of: providing a notification that indicates that the anomalous behavior was detected; causing an access key utilized to access the at least one resource to be changed; or causing access to the at least one resource to be restricted for the entity.

A computer-readable storage medium having program instructions recorded thereon that, when executed by at least one processor of a computing system, perform a method. The method includes: receiving a log specifying a plurality of access enablement operations performed with respect to an entity, the plurality of access enablement operations enabling access key-based resource access operations to be performed with respect to at least one resource of a storage platform; identifying a number of access enablement operations within the plurality of access enablement operations that occurred in a particular time period; determining that the identified number of access enablement operations meets a threshold condition; determining that anomalous behavior has occurred with respect to the entity based on the threshold condition being met; and responsive to determining that anomalous behavior has occurred, causing a mitigation action to be performed that mitigates the anomalous behavior.

In one implementation of the foregoing computer-readable storage medium, identifying the number of access enablement operations within the plurality of access enablement operations that occurred in the particular time period comprises: identifying a number of successful access enablement operations within the plurality of access enablement operations that occurred in the particular time period; and determining that the identified number of access enablement operation meets the threshold condition comprises: determining that the identified number of successful operations that occurred in the particular time period meets the threshold condition.

In one implementation of the foregoing computer-readable storage medium, identifying the number of access enablement operations within the plurality of access enablement operations that occurred in the particular time period comprises: identifying a number of unsuccessful access enablement operations within the plurality of access enablement operations that occurred in the particular time period; and determining that the identified number of access enablement operation meets the threshold condition comprises: determining that the identified number of unsuccessful operations that occurred in the particular time period meets the threshold condition.

In one implementation of the foregoing computer-readable storage medium, an access enablement operation of the plurality of access enablement operations comprises a request for an access key for accessing the at least one resource of the storage platform.

In one implementation of the foregoing computer-readable storage medium, the storage platform comprises at least one of: a cloud-based distributed database; or a cloud-based distributed file system configured to store unstructured data.

In one implementation of the foregoing computer-readable storage medium, the entity comprises at least one of: a user; a role to which a plurality of users is assigned; or a cloud-based subscription to which the storage platform is associated.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:
1. A computing system, comprising:
at least one processor circuit; and
at least one memory that stores program code configured to be executed by the at least one processor circuit, the program code comprising:
an anomaly detection engine configured to:
receive one or more logs that specify a plurality of access enablement operations performed with respect to an entity, the plurality of access enablement operations including requests for access keys and enabling access key-based resource access operations to be performed with respect to at least one resource of a storage platform, wherein an access enablement operation of the plurality of access enablement operations comprises a request for an access key for accessing a resource of the storage platform, the request including an identifier of the user or role that is attempting to access the resource, an identifier of the resource, and an identifier of a cloud-based subscription from which the resource is accessed;
identify a number of successful access enablement operations within the plurality of access enablement operations that occurred in a particular time period;
determine that the identified number of successful access enablement operations meets a threshold condition;
determine that anomalous behavior has occurred with respect to the entity based on the threshold condition being met; and responsive to determining that anomalous behavior has occurred, cause a mitigation action to be performed that mitigates the anomalous behavior.

2. The computing system of claim 1, wherein the storage platform comprises at least one of:
a cloud-based distributed database; or
a cloud-based distributed file system configured to store unstructured data.

3. The computing system of claim 1, wherein the entity comprises at least one of:
a user;
a role to which a plurality of users is assigned; or
a cloud-based subscription to which the storage platform is associated.

4. The computing system of claim 1, wherein the anomaly detection engine is configured to cause the mitigation action to be performed that mitigates the anomalous behavior by performing at least one of:
causing an access key utilized to access the at least one resource to be changed; or
causing access to the at least one resource to be restricted for the entity.

5. The computing system of claim 1, wherein a log of the received one or more logs includes, for an access enablement operation, an indication as to whether the access enablement operation was successful or unsuccessful.

6. The computing system of claim 1, wherein the threshold condition is whether the identified number of successful control plane operations that occurred in the particular time period is greater than a determined average number of successful control plane operations that occurred in the particular time period.

7. The computing system of claim 1, wherein the anomaly detection engine is configured to cause the mitigation action to be performed that mitigates the anomalous behavior by performing at least one of:
providing a notification that indicates that the anomalous behavior was detected.

8. A method performed by a computing system, comprising:
receiving one or more logs that specify a plurality of access enablement operations performed with respect to an entity, the plurality of access enablement operations enabling access key-based resource access operations to be performed with respect to at least one resource of a storage platform, wherein an access enablement operation of the plurality of access enablement operations comprises a request for an access key for accessing a resource of the storage platform, the request including an identifier of the user or role that is attempting to access the resource, an identifier of the resource, and an identifier of a cloud-based subscription from which the resource is accessed;
identifying a number of successful access enablement operations within the plurality of access enablement operations that occurred in a particular time period;
determining that the identified number of successful access enablement operations meets a threshold condition;
determining that anomalous behavior has occurred with respect to the entity based on the threshold condition being met; and
responsive to determining that anomalous behavior has occurred, causing a mitigation action to be performed that mitigates the anomalous behavior.

9. The method of claim 8, wherein the storage platform comprises at least one of:
a cloud-based distributed database; or
a cloud-based distributed file system configured to store unstructured data.

10. The method of claim 8, wherein the entity comprises at least one of:
a user;
a role to which a plurality of users is assigned; or
a cloud-based subscription to which the storage platform is associated.

11. The method of claim 8, wherein causing the mitigation action to be performed that mitigates the anomalous behavior comprises at least one of:
providing a notification that indicates that the anomalous behavior was detected;
causing an access key utilized to access the at least one resource to be changed; or
causing access to the at least one resource to be restricted for the entity.

12. The method of claim 8, wherein said receiving one or more logs comprises:
receiving a log that includes, for an access enablement operation, an indication as to whether the access enablement operation was successful or unsuccessful.

13. The method of claim 8, wherein said determining that the identified number of unsuccessful access enablement operations meets a threshold condition comprises:
determining whether the identified number of successful control plane operations that occurred in the particular time period is greater than a determined average number of successful control plane operations that occurred in the particular time period.

14. A computer-readable storage device having program instructions recorded thereon that, when executed by at least one processor of a computing system, perform a method, the method comprising:
receiving one or more logs that specify a plurality of access enablement operations performed with respect to an entity, the plurality of access enablement operations including requests for access keys and enabling access key-based resource access operations to be performed with respect to at least one resource of a storage platform, wherein an access enablement operation of the plurality of access enablement operations comprises a request for an access key for accessing a resource of the storage platform, the request including an identifier of the user or role that is attempting to access the resource, an identifier of the resource, and an identifier of a cloud-based subscription from which the resource is accessed;
identifying at least one of a number of successful access enablement operations within the plurality of access enablement operations that occurred in a particular time period or a number of unsuccessful access enablement operations within the plurality of access enablement operations that occurred in the particular time period;
determining that the identified at least one of the number of successful access enablement operations or the number of unsuccessful access enablement operations meets a threshold condition;
determining that anomalous behavior has occurred with respect to the entity based on the threshold condition being met; and
responsive to determining that anomalous behavior has occurred, causing a mitigation action to be performed that mitigates the anomalous behavior.

15. The computer-readable storage device of claim 14, wherein the storage platform comprises at least one of:

a cloud-based distributed database; or a cloud-based distributed file system configured to store unstructured data.

16. The computer-readable storage device of claim 14, wherein the entity comprises at least one of:

a user;

a role to which a plurality of users is assigned; or a cloud-based subscription to which the storage platform is associated.

17. The computer-readable storage device of claim 14, wherein said determining that the identified at least one of the number of successful access enablement operations or the number of unsuccessful access enablement operations meets a threshold condition comprises:

determining whether the identified number of successful control plane operations that occurred in the particular time period is greater than a determined average number of successful control plane operations that occurred in the particular time period.

18. The computer-readable storage device of claim 14, wherein said determining that the identified at least one of the number of successful access enablement operations or the number of unsuccessful access enablement operations meets a threshold condition comprises:

determining whether the identified number of unsuccessful control plane operations that occurred in the particular time period is greater than a determined average number of unsuccessful control plane operations that occurred in the particular time period.

19. The computer-readable storage device of claim 14, wherein said determining that the identified at least one of the number of successful access enablement operations or the number of unsuccessful access enablement operations meets a threshold condition comprises:

detecting an unusually high level of unsuccessful executions of control plane operations based on a spike detection model.

20. The computer-readable storage device of claim 14, wherein said causing a mitigation action to be performed that mitigates the anomalous behavior comprises:

providing a notification that indicates that the anomalous behavior was detected;

causing an access key utilized to access the at least one resource to be changed; or causing access to the at least one resource to be restricted for the entity.

* * * * *